United States Patent
Taruya et al.

(10) Patent No.: US 8,663,436 B2
(45) Date of Patent: Mar. 4, 2014

(54) WATER ELECTROLYSIS SYSTEM

(75) Inventors: Kenji Taruya, Wako (JP); Koji Nakazawa, Wako (JP); Hisashi Nagaoka, Wako (JP); Daisuke Kurashina, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 13/239,834

(22) Filed: Sep. 22, 2011

(65) Prior Publication Data

US 2012/0103796 A1    May 3, 2012

(30) Foreign Application Priority Data

Oct. 28, 2010   (JP) .................................. 2010-241590

(51) Int. Cl.
*C25B 15/00* (2006.01)
*C25B 9/00* (2006.01)
*C25B 1/04* (2006.01)

(52) U.S. Cl.
USPC ........... 204/276; 204/193; 204/194; 204/242; 95/24; 95/241; 95/259; 96/155; 96/243; 96/245; 96/414; 96/415; 96/416; 96/417; 96/408; 96/409; 96/410; 96/411; 96/412; 55/319; 55/434; 55/462

(58) Field of Classification Search
USPC .............. 204/193, 194, 242; 95/24, 241, 259; 96/155, 243, 245, 414–417, 408–412; 55/319, 434, 462
See application file for complete search history.

(56) References Cited

U.S. PATENT DOCUMENTS

| 8,557,090 B2 * | 10/2013 | Duret ......................... 204/229.4 |
| 2005/0072688 A1 * | 4/2005 | Meltser ......................... 205/628 |
| 2010/0206740 A1 * | 8/2010 | Takeuchi et al. .............. 205/338 |

FOREIGN PATENT DOCUMENTS

JP    08-144078    6/1996

* cited by examiner

*Primary Examiner* — Harry D Wilkins, III
*Assistant Examiner* — Zulmariam Mendez
(74) *Attorney, Agent, or Firm* — Ditthavong Mori & Steiner, P.C.

(57) ABSTRACT

A water electrolysis system includes a high-pressure water electrolysis apparatus and a gas-liquid separation device. The gas-liquid separation device includes a block member which includes a gas-liquid separation opening and a water-level detection opening. The gas-liquid separation opening and the water-level detection opening extend substantially vertically and includes respective bottom portions which integrally communicate with a discharge pipe. The discharge pipe is disposed at a lower side portion of the block member. The water-level detection opening includes a top portion and a top water-level detection section. The block member further includes an inlet hole in which the hydrogen is introduced from the high-pressure water electrolysis device. The inlet hole is disposed at an upper side portion of the block member. The inlet hole is positioned above the top water-level detection section of the water-level detection opening.

13 Claims, 7 Drawing Sheets

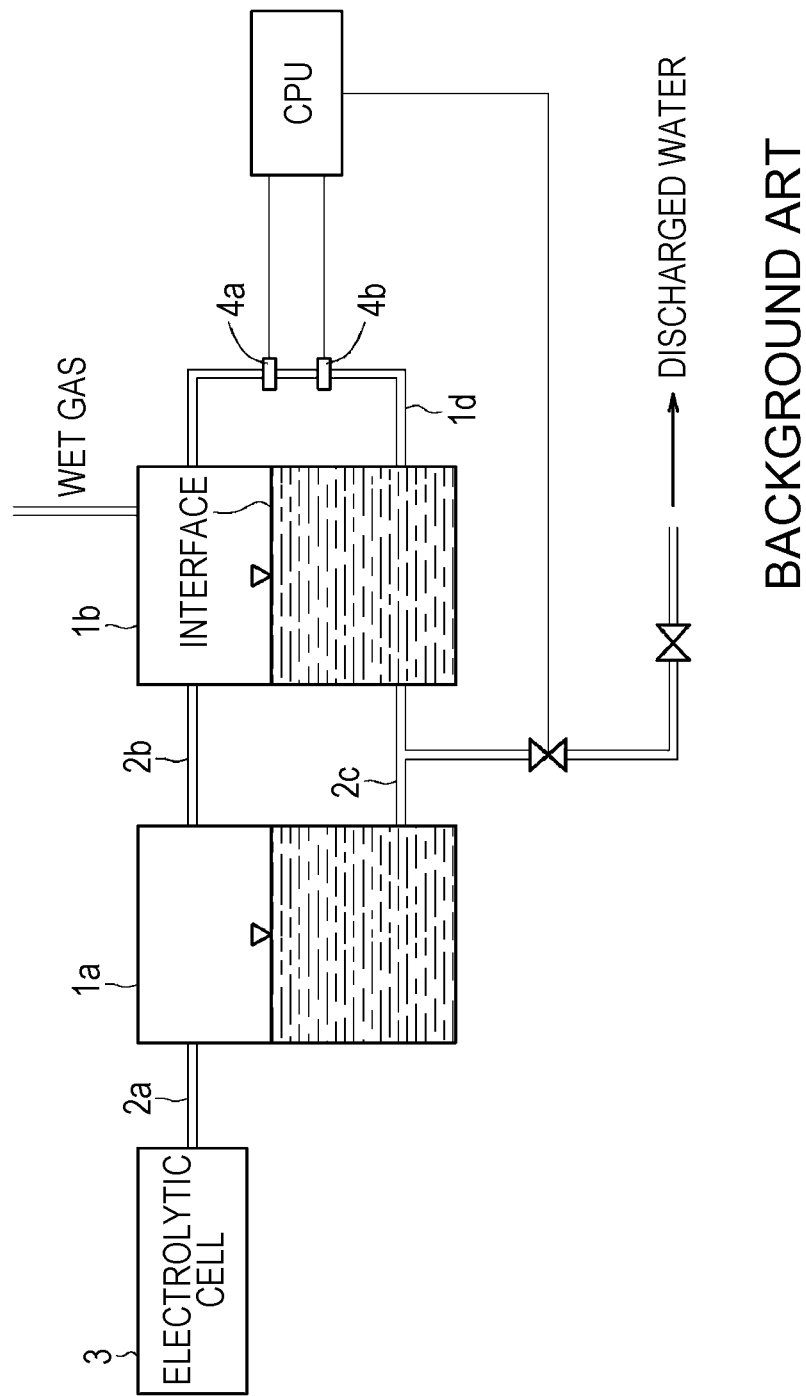

WATER ELECTROLYSIS SYSTEM

CROSS-REFERENCE TO RELATED APPLICATIONS

The present application claims priority under 35 U.S.C. §119 to Japanese Patent Application No. 2010-241590, filed Oct. 28, 2010, entitled "Water Electrolysis System". The contents of this application are incorporated herein by reference in their entirety.

BACKGROUND OF THE INVENTION

1. Field of the Invention

The present invention relates to a water electrolysis system.

2. Discussion of the Background

Hydrogen gas can be used as fuel gas to cause a polymer electrolyte fuel cell to generate electric power. Typically, a water electrolysis device is employed in producing hydrogen gas. The water electrolysis device uses a solid polymer electrolyte membrane (ion exchange membrane) to decompose water to generate hydrogen (and oxygen). Electrode catalytic layers are provided at opposite surfaces of the solid polymer electrolyte membrane to form an electrolyte membrane electrode assembly, and an anode-side feed and a cathode-side feed are disposed at both sides of the electrolyte membrane electrode assembly. This configuration forms a unit.

The water electrolysis device includes a plurality of such units being stacked. In this state, a voltage is applied to both ends in the direction in which they are stacked, and water is supplied to the anode-side feed. At the anode of each of the electrolyte membrane electrode assemblies, water is decomposed and hydrogen ions (protons) are formed, the hydrogen ions permeate through the solid polymer electrolyte membrane and move to the cathode, they combine with electrons, and hydrogen is formed. At the anode, oxygen generated together with the hydrogen is discharged with redundant water from the unit.

The above-described water electrolysis device produces hydrogen containing moisture, and thus it is necessary to remove the moisture from the hydrogen to obtain hydrogen in a dry state, for example, at or below 5 ppm (hereinafter referred to also as dry hydrogen). One known example of a technique that meets such a need is a gas-liquid separation device of a water electrolysis device disclosed in Japanese Unexamined Patent Application Publication No. 8-144078.

This gas-liquid separation device includes a first gas-liquid separation tank 1a and a second gas-liquid separation tank 1b, as illustrated in FIG. 7. The upper portion of the first gas-liquid separation tank 1a communicates with an anode chamber of a water electrolysis device (electrolytic cell) 3 through a gas and liquid inlet tube 2a. Oxygen generated at the anode of the water electrolysis device 3 and pure water supplied to the anode chamber of the water electrolysis device 3 are transported as mixture to the first gas-liquid separation tank 1a through the gas and liquid inlet tube 2a.

The upper portion of the first gas-liquid separation tank 1a and the upper portion of the second gas-liquid separation tank 1b are connected with a gas communicating tube 2b for oxygen disposed therebetween, and oxygen gas obtained by gas-liquid separation in the first gas-liquid separation tank 1a flows into the second gas-liquid separation tank 1b. The lower portion of the first gas-liquid separation tank 1a and the lower portion of the second gas-liquid separation tank 1b are connected with a liquid communicating tube 2c for pure water disposed therebetween, and pure water obtained by gas-liquid separation in the first gas-liquid separation tank 1a flows into the second gas-liquid separation tank 1b.

The second gas-liquid separation tank 1b is provided with a bypass path 1d for use in controlling a liquid level of a liquid component obtained by separation in the first gas-liquid separation tank 1a. The bypass path 1d has a substantially U shape and extends substantially vertically along the wall surface of the tank. Optical sensors 4a and 4b for use in controlling a liquid level are provided on the outside of the bypass path 1d at locations corresponding to preset upper and lower limit positions, respectively, for the liquid level in the second gas-liquid separation tank 1b.

A high-pressure water electrolysis system for generating hydrogen of high pressure (e.g., approximately 35 MPa) at the cathode is used in a water electrolysis system. In this case, high-pressure hydrogen containing moisture is introduced into a gas-liquid separation device connected to the cathode of the water electrolysis device.

SUMMARY OF THE INVENTION

According to one aspect of the present invention, a water electrolysis system includes a high-pressure water electrolysis apparatus and a gas-liquid separation device. The high-pressure water electrolysis apparatus is configured to electrolyze water to generate oxygen and hydrogen having a higher pressure than a pressure of the oxygen. The gas-liquid separation device is to separate the hydrogen containing moisture discharged from the high-pressure water electrolysis apparatus into the hydrogen from which the moisture is removed and water. The gas-liquid separation device is to supply the hydrogen from which the moisture has been removed to a hydrogen pipe that communicates with a hydrogen filling unit. The gas-liquid separation device is to discharge the water to a discharge pipe. The gas-liquid separation device includes a block member which includes a gas-liquid separation opening and a water-level detection opening. The gas-liquid separation opening and the water-level detection opening extend substantially vertically and includes respective bottom portions which integrally communicate with the discharge pipe. The discharge pipe is disposed at a lower side portion of the block member. The water-level detection opening includes a top portion and a top water-level detection section. The top portion is coupled to an upper portion of the gas-liquid separation opening. The upper portion communicates with the hydrogen pipe disposed at an upper portion of the block member. The block member further includes an inlet hole in which the hydrogen is introduced from the high-pressure water electrolysis device. The inlet hole is disposed at an upper side portion of the block member. The inlet hole is positioned above the top water-level detection section of the water-level detection opening.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 7 illustrates a gas-liquid separation device disclosed in the related art.

DESCRIPTION OF THE EMBODIMENTS

Figure 1:
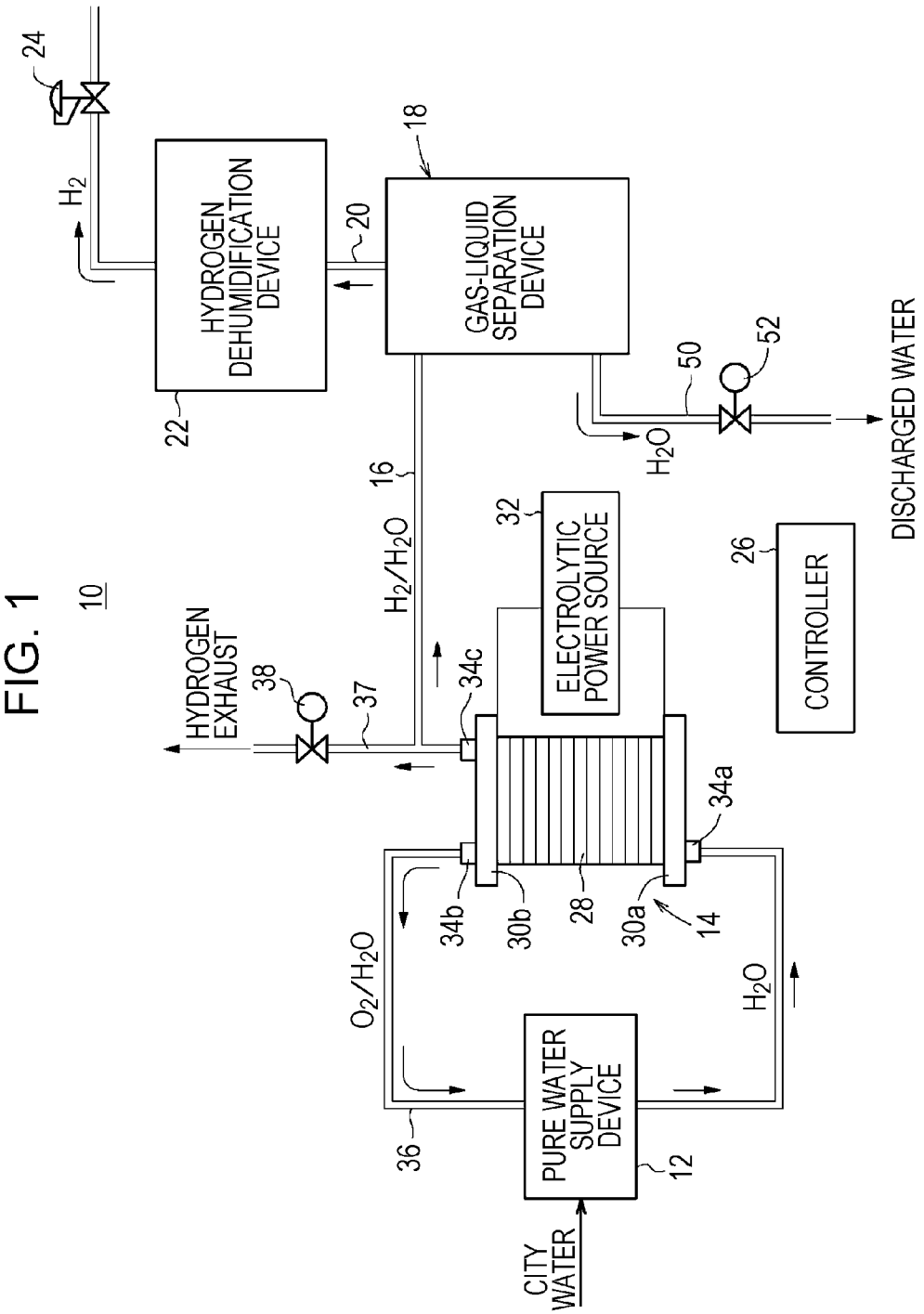
FIG. 1 illustrates a schematic configuration of a water electrolysis system according to a first embodiment of the present invention.

The embodiments will now be described with reference to the accompanying drawings, wherein like reference numerals designate corresponding or identical elements throughout the various drawings.

As illustrated in FIG. 1, a water electrolysis system 10 according to a first embodiment of the present invention includes a high-pressure water electrolysis apparatus 14 that receives pure water generated from commercial water supplied form a pure water supply device 12 and produces high-pressure hydrogen (higher than the oxygen pressure, e.g., at approximately 1 MPa to 70 MPa) by electrolyzing the pure water.

The water electrolysis system 10 further includes a gas-liquid separation device 18 that removes moisture from hydrogen introduced from the high-pressure water electrolysis apparatus 14 to a hydrogen outlet path 16, a hydrogen dehumidification device (e.g., water absorption device) 22 that absorbs and removes the moisture contained in the hydrogen introduced from the gas-liquid separation device 18 to a hydrogen pipe 20, a back pressure valve 24 disposed downstream of the hydrogen dehumidification device 22 and maintaining the hydrogen generated by the high-pressure water electrolysis apparatus 14 at a high pressure, and a controller 26 that controls the entire system.

The high-pressure water electrolysis apparatus 14 includes a plurality of water decomposition cells 28 being stacked. End plates 30a and 30b are disposed on both ends of the water decomposition cells 28 in the direction in which they are stacked. The high-pressure water electrolysis apparatus 14 is connected to a direct-current electrolytic power source 32.

The end plate 30a is connected to a pipe 34a, and the end plate 30b is connected to pipes 34b and 34c. The pipes 34a and 34b are used for circulating pure water from the pure water supply device 12 through a circulation path 36. The pipe 34c is a hydrogen discharge port and connected to the gas-liquid separation device 18 through the hydrogen outlet path 16. The hydrogen outlet path 16 is provided with a hydrogen discharge path 37 branching therefrom. The hydrogen discharge path 37 is provided with a depressurization on-off valve 38.

Figure 2:
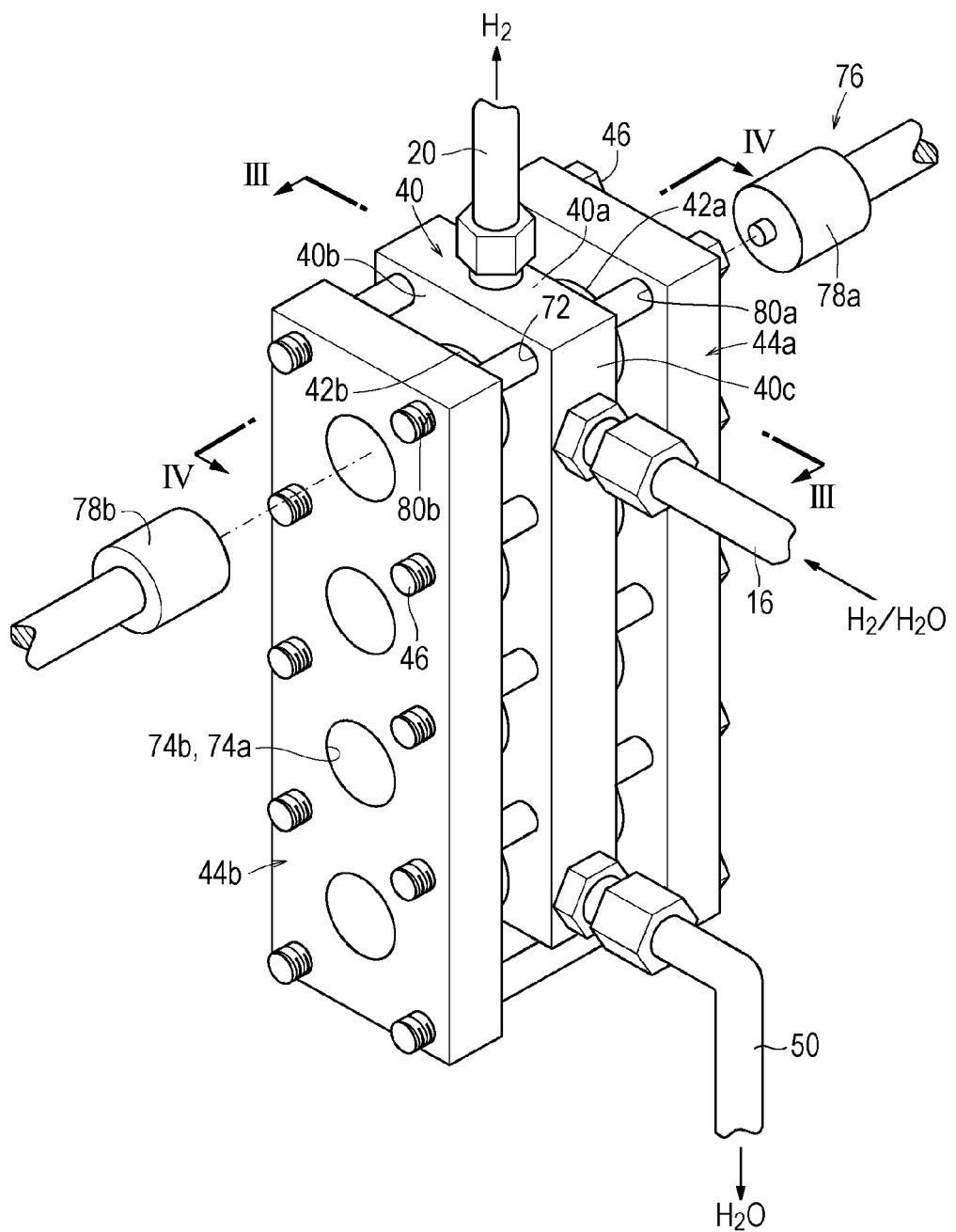
FIG. 2 is a perspective view of a gas-liquid separation device included in the water electrolysis system.

As illustrated in FIG. 2, the gas-liquid separation device 18 includes a block member 40 made of stainless steel, such as SUS 316, for example. The block member 40 has a substantially rectangular parallelepiped shape and includes opposite surfaces (having a larger area) 40a and 40b. The block member 40 is disposed between a pair of plate members 44a and 44b such that a plurality of permeable blocks 42a are located between the surface 40a and the plate member 44a and a plurality of permeable blocks 42b are located between the surface 40b and the plate member 44b. The pair of plate members 44a and 44b are clamped and fixed by a plurality of clamp bolts 46.

Figure 3:
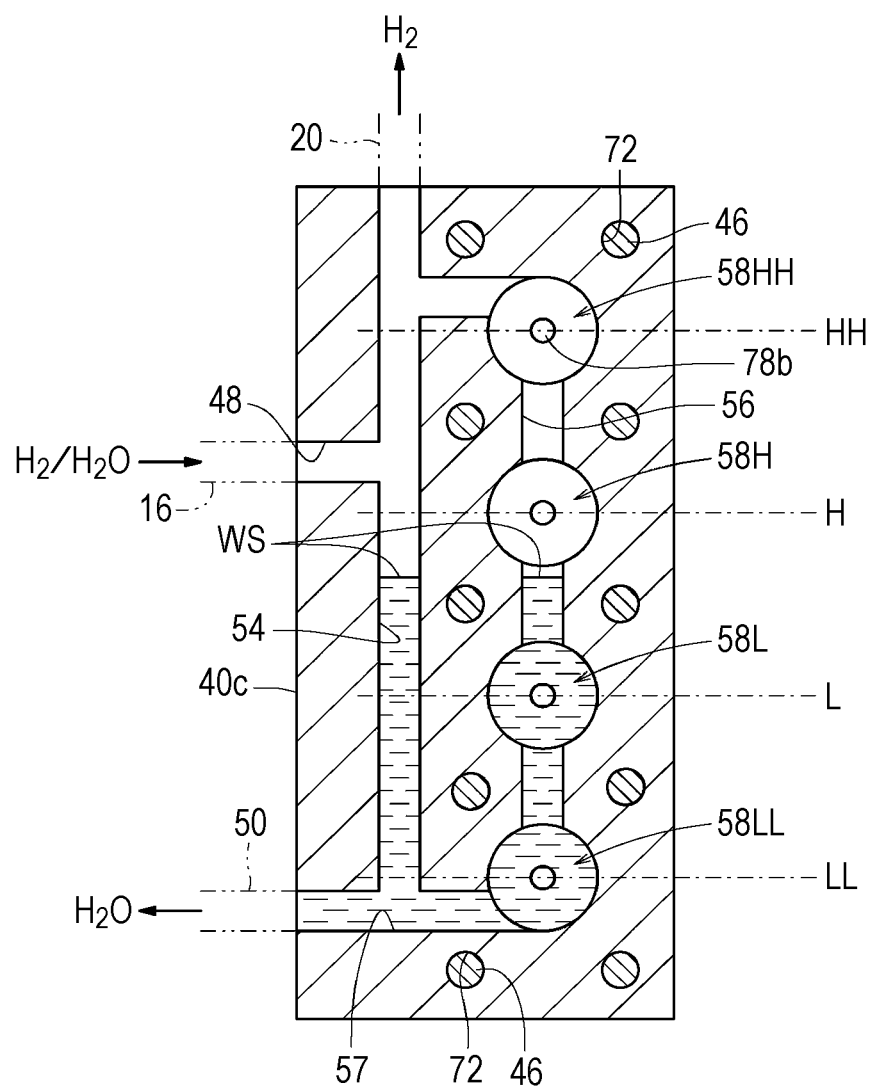
FIG. 3 is a cross-sectional view of the gas-liquid separation device taken along the line III-III in FIG. 2.

As illustrated in FIG. 3, the block member 40 includes a side surface 40c (a surface having a smaller area and intersecting the opposite surfaces 40a and 40b) and an inlet hole 48 formed in an upper side portion adjacent to the side surface 40c. The inlet hole 48 receives high-pressure hydrogen introduced from the high-pressure water electrolysis apparatus 14 through the hydrogen outlet path 16. The upper portion of the block member 40 is coupled to the hydrogen pipe 20, and the lower side portion of the block member 40 is connected to a discharge pipe 50.

As illustrated in FIG. 1, the discharge pipe 50 is provided with a discharge valve 52. The discharge pipe 50 may be connected to the pure water supply device 12 and may supply water to the pure water supply device 12, for example.

As illustrated in FIG. 3, the block member 40 includes a gas-liquid separation opening 54 and a water-level detection opening 56 formed therein. The gas-liquid separation opening 54 and the water-level detection opening 56 extend along the substantially vertical direction of the block member 40. Specifically, the gas-liquid separation opening 54 and the water-level detection opening 56, each of which has an elongated opening portion having a substantially circular cross section, are directly formed in the block member 40 by punching in the block member 40. Each of the elongated opening portions is subjected to an end closing process as needed (not illustrated).

The gas-liquid separation opening 54 and the water-level detection opening 56 substantially vertically extend substantially in parallel with each other. However, they may be disposed in another form. For example, the gas-liquid separation opening 54 and the water-level detection opening 56 may be inclined to each other at a predetermined angle.

The bottoms of the gas-liquid separation opening 54 and the water-level detection opening 56 are terminated inside the block member 40 and integrally communicate with the discharge pipe 50 through a coupling passage 57. The top of the water-level detection opening 56 is terminated inside the block member 40 and coupled to the upper portion of the gas-liquid separation opening 54.

The water-level detection opening 56 has a bottom water-level detection section 58L for use in detecting whether a water level WS is at a set lower position (L), a top water-level detection section 58H for use in detecting whether the water level WS is at a set upper position (H), a lower-limit water-level detection section 58LL for use in detecting whether the water level WS is at a lower-limit set height (LL), and an upper-limit water-level detection section 58HH for use in detecting whether the water level WS is at an upper-limit set height (HH).

Figure 4:
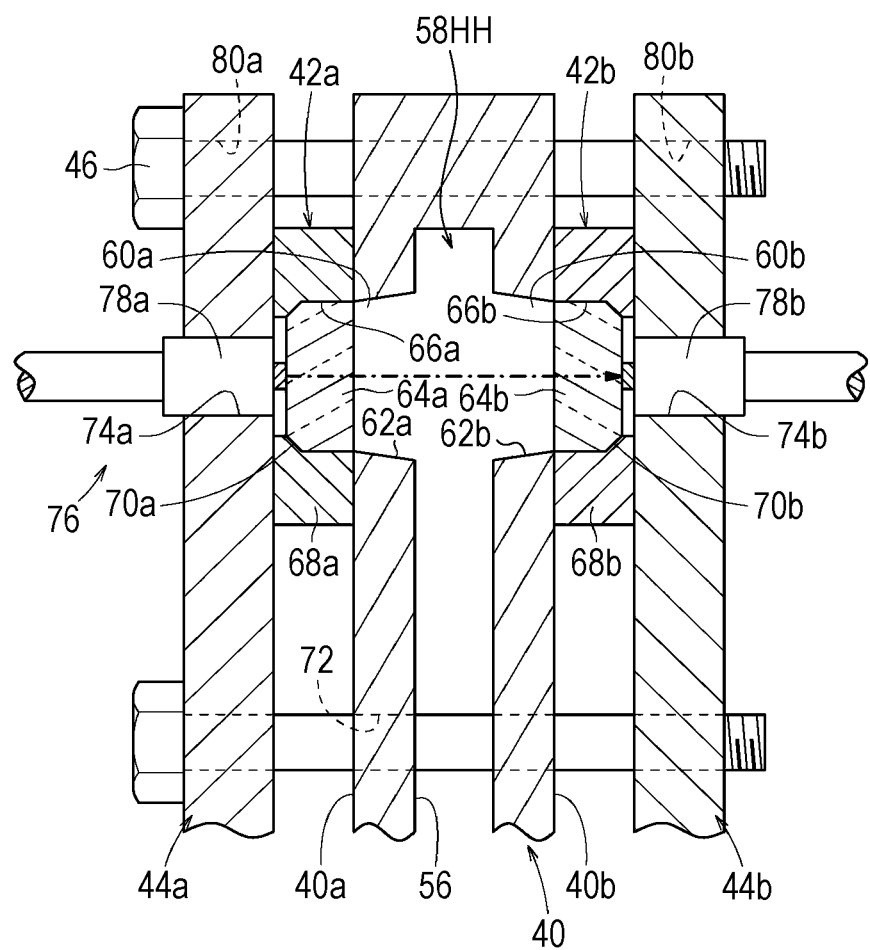
FIG. 4 is a cross-sectional view of the gas-liquid separation device taken along the line IV-IV in FIG. 2.

As illustrated in FIG. 4, the upper-limit water-level detection section 58HH includes a pair of windows 60a and 60b opened outward disposed in the opposite surfaces 40a and 40b, respectively, and opposed to each other. The windows 60a and 60b include window side walls having slopes 62a and 62b inclined outward toward the water-level detection opening 56 at least in their bottom surfaces. Each of the slopes 62a and 62b has an angle of inclination that is set at 1° or more with respect to the horizontal direction.

The permeable blocks 42a and 42b include light transmitting members, for example, substantially columnar glass bodies 64a and 64b, respectively, and metallic block members 68a and 68b, respectively. The metallic block members 68a and 68b has openings 66a and 66b, respectively, that accommodate the glass bodies 64a and 64b, respectively. The bottom portions of the glass bodies 64a and 64b and the bottom portions of the openings 66a and 66b are engaged with each other at slopes 70a and 70b, respectively. Instead of the slopes 70a and 70b, the outer surfaces of the glass bodies 64a and 64b and the inner wall surfaces of the openings 66a and 66b may be in contact with each other at tapered surfaces.

The bottom water-level detection section 58L, top water-level detection section 58H, and lower-limit water-level detection section 58LL have substantially the same configuration as that of the above-described upper-limit water-level detection section 58HH. The detailed description thereof is not repeated here.

As illustrated in FIG. 3, the inlet hole 48 is located above the top water-level detection section 58H of the water-level detection opening 56. Specifically, the inlet hole 48 is arranged at a height position between the top water-level detection section 58H and the upper-limit water-level detection section 58HH.

The block member 40 has a plurality of holes 72 for allowing bolts to be inserted therein (hereinafter referred to as bolt insertion holes 72). The bolt insertion holes 72 are disposed adjacent to both sides of the bottom water-level detection section 58L, top water-level detection section 58H, lower-limit water-level detection section 58LL, and upper-limit water-level detection section 58HH and arranged at height positions different from those of these sections.

As illustrated in FIGS. 2 and 4, the plate member 44a has through holes 74a facing the windows 60a included in the bottom water-level detection section 58L, top water-level detection section 58H, lower-limit water-level detection section 58LL, and upper-limit water-level detection section 58HH. A light emitter 78a included in a transmission optical sensor 76 is attached in each of the through holes 74a. The plate member 44a has a plurality of holes 80a corresponding to the bolt insertion holes 72.

The plate member 44b has through holes 74b facing the windows 60b included in the bottom water-level detection section 58L, top water-level detection section 58H, lower-limit water-level detection section 58LL, and upper-limit water-level detection section 58HH. A light receiver 78b included in the transmission optical sensor 76 is attached in each of the through holes 74b. The plate member 44b has a plurality of bolt holes 80b corresponding to the bolt insertion holes 72.

The bolts 46 are inserted from the respective holes 80a of the plate member 44a to the bolt insertion holes 72 of the block member 40 and are screwed into the bolt holes 80b of the plate member 44b, thus imposing a clamp load between the plate members 44a and 44b.

The transmission optical sensor 76 emits a laser beam to the window 60a from the glass body 64a by the use of the light emitter 78a and receives the laser beam that has passed through water stored in the water-level detection opening 56, the window 60b, and the glass body 64b by the use of the light receiver 78b. The presence and absence of the water can be detected from the intensity of transmission of the laser beam through the water.

As illustrated in FIG. 1, the hydrogen dehumidification device 22 includes an absorption tube (not illustrated) that absorbs water vapor (moisture) contained in hydrogen by physical absorption action, the absorption tube being filled with a moisture absorbent that ejects moisture to the outside and is then regenerated. The hydrogen pipe 20 includes a first end connected to the downstream side (exit) of the hydrogen dehumidification device 22 through the back pressure valve 24 and a second end provided with a coupling section connected to a fuel tank of a fuel-cell vehicle (not illustrated).

Operations of the water electrolysis system 10 having the above-described configuration are described below.

First, when the water electrolysis system 10 starts, pure water generated from commercial water through the pure water supply device 12 is supplied to the high-pressure water electrolysis apparatus 14. The high-pressure water electrolysis apparatus 14 electrolyzes the pure water by a power applied by the electrolytic power source 32, generates oxygen at the anode, and generates hydrogen at the cathode.

The hydrogen generated in the high-pressure water electrolysis apparatus 14 is transmitted to the gas-liquid separation device 18 through the hydrogen outlet path 16. As illustrated in FIG. 3, the gas-liquid separation device 18 receives the hydrogen supplied to the gas-liquid separation opening 54 through the inlet hole 48 of the block member 40, removes water vapor contained in the supplied hydrogen from that hydrogen, and stores water in the gas-liquid separation opening 54 and the water-level detection opening 56.

The hydrogen from which water vapor has been removed is introduced to the hydrogen pipe 20 and transmitted to the hydrogen dehumidification device 22. Accordingly, the hydrogen dehumidification device 22 obtains hydrogen in a dry state (dry hydrogen) by absorbing the water vapor contained in the hydrogen and maintains this hydrogen at a predetermined high pressure through the back pressure valve 24. This high-pressure hydrogen can be supplied to a fuel tank of a fuel-cell vehicle (not illustrated).

As illustrated in FIG. 3, the water-level detection opening 56 included in the gas-liquid separation device 18 has the bottom water-level detection section 58L for use in detecting whether a water level WS is at the set lower position (L), the top water-level detection section 58H for use in detecting whether the water level WS is at the set upper position (H), the lower-limit water-level detection section 58LL for use in detecting whether the water level WS is at the lower-limit set height (LL), and the upper-limit water-level detection section 58HH for use in detecting whether the water level WS is at the upper-limit set height (HH).

When determining that the water level WS has fallen to the set lower position (L) through the bottom water-level detection section 58L, the controller 26 closes the discharge valve 52 and stops discharging water from the block member 40 to the discharge pipe 50.

When determining that the water level WS has risen to the set upper position (H) through the top water-level detection section 58H, the controller 26 opens the discharge valve 52 and provides an instruction to discharge water to the discharge pipe 50.

When determining that the water level WS has fallen to the lower-limit set height (LL) through the lower-limit water-level detection section 58LL or determining that the water level WS has risen to the upper-limit set height (HH) through the upper-limit water-level detection section 58HH, the controller 26 determines a system malfunction and stops the water electrolysis system 10.

For the first embodiment, in which the block member 40 includes the substantially vertically extending gas-liquid separation opening 54 and water-level detection opening 56 directly formed therein by punching, the strength of the block member 40 can be effectively improved, and the advantageous effect of the block member 40 being capable of sufficiently withstanding the pressure of high-pressure hydrogen in producing the high-pressure hydrogen is obtainable.

In addition, the block member 40 is disposed between the pair of the plate members 44a and 44b such that the plurality of permeable blocks 42a and 42b are located between the opposite surfaces 40a and 40b and the plate members 44a and 44b, and the pair of plate members 44a and 44b are clamped and fixed by the plurality of clamp bolts 46. Accordingly, the strength and stiffness of the entire gas-liquid separation device 18 can be satisfactorily improved.

Additionally, the inlet hole 48 into which high-pressure hydrogen is introduced from the high-pressure water electrolysis apparatus 14 is located above the top water-level detection section 58H of the water-level detection opening 56. Therefore, in normal operation, the water level in the gas-liquid separation opening 54 is maintained at a position below the inlet hole 48. This can prevent hydrogen from flowing into water stored in the gas-liquid separation opening 54 in introducing high-pressure hydrogen into the gas-liquid separation opening 54.

Accordingly, water droplets and air bubbles occurring in the top water-level detection section 58H and the bottom water-level detection section 58L in the water-level detection opening 56 can be satisfactorily reduced. Therefore, the advantageous effects of the gas-liquid separation device 18 being capable of satisfactorily separating high-pressure hydrogen containing moisture into the hydrogen and water, having sufficient strength, and accurately measuring the water level are obtainable.

Moreover, the window side walls included in the windows 60a and 60b include the slopes 62a and 62b inclined outward toward the water-level detection opening 56. Therefore, the bottom portions of the slopes 62a and 62b are inclined downward toward the water-level detection opening 56 with respect to the horizontal direction, and the advantage of significantly reducing accumulation of water on the slopes 62a and 62b is obtainable.

Figure 5:
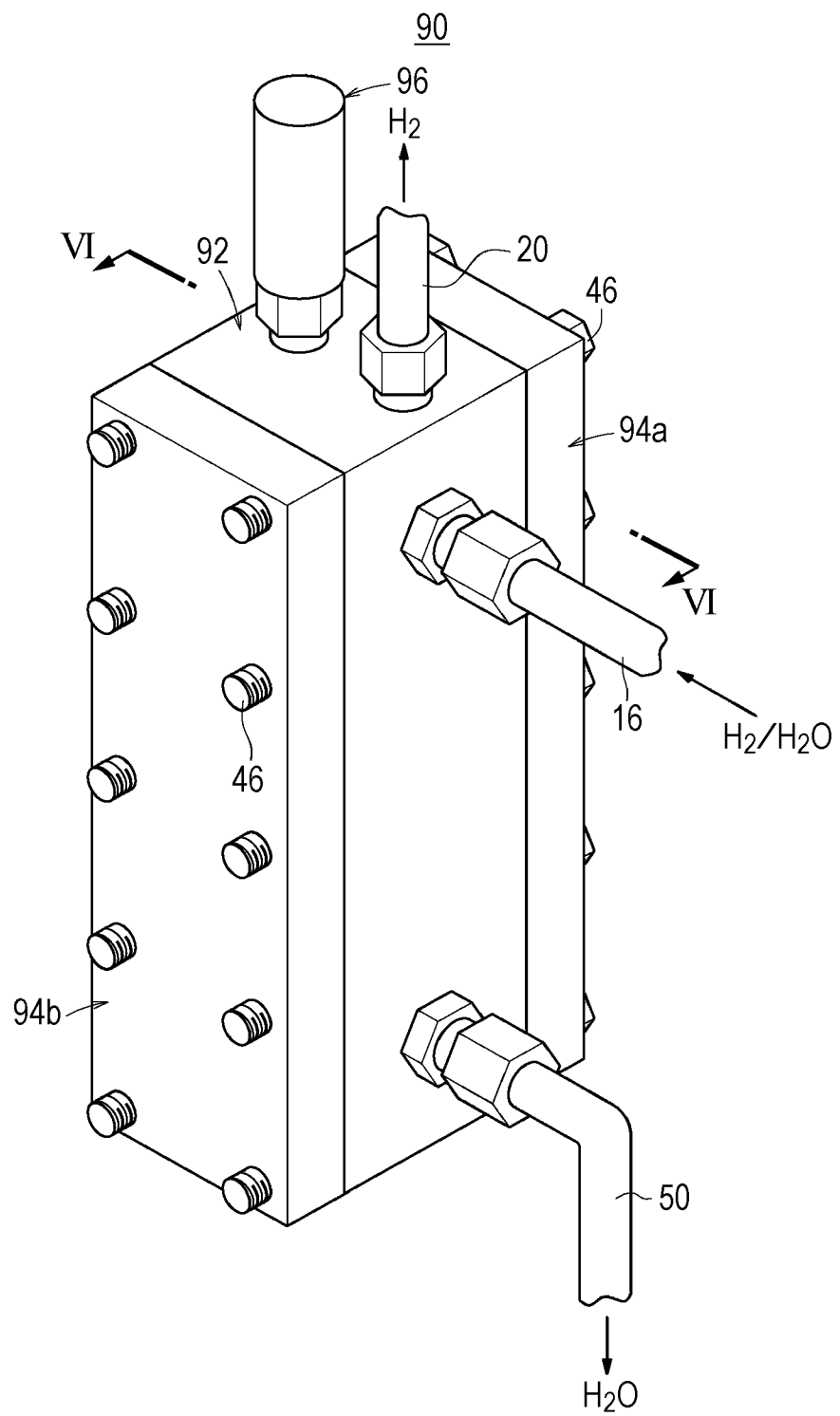
FIG. 5 is a perspective view of a gas-liquid separation device included in a water electrolysis system according to a second embodiment of the present invention.

FIG. 5 is a perspective view of a gas-liquid separation device 90 included in a water electrolysis system according to a second embodiment of the present invention.

The same reference numerals are used in the same components as in the gas-liquid separation device 18 included in the water electrolysis system 10 according to the first embodiment, and the detailed description thereof is not repeated here.

The gas-liquid separation device 90 includes a block member 92 and a pair of plate members 94a and 94b. The plate members 94a and 94b are directly disposed on opposite surfaces of the block member 92 and clamped and fixed by the plurality of clamp bolts 46.

Figure 6:
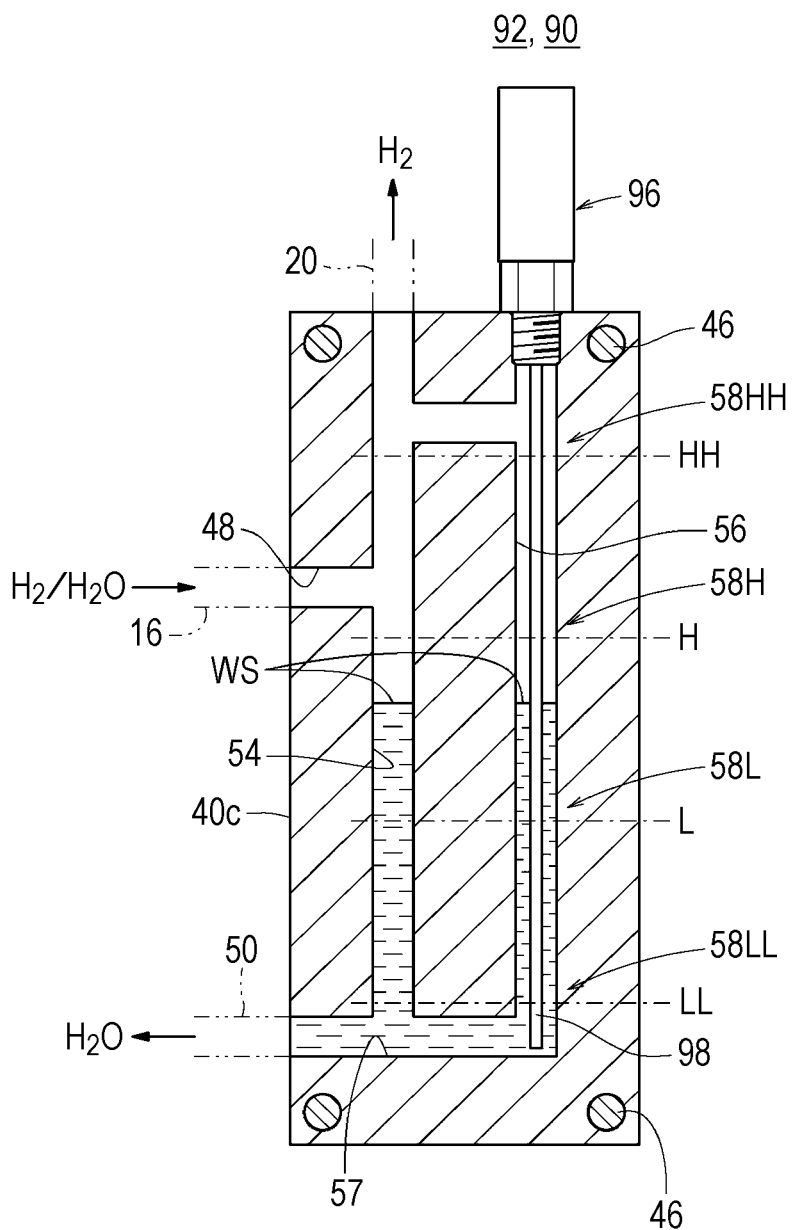
FIG. 6 is a cross-sectional view of the gas-liquid separation device taken along the line VI-VI in FIG. 5.

As illustrated in FIGS. 5 and 6, a capacitance type level gauge 96 is attached to the upper portion of the block member 92. As illustrated in FIG. 6, the water gauge 96 includes a detection section 98 substantially vertically extending in the water-level detection opening 56. The detection section 98 functions as the bottom water-level detection section 58L, top water-level detection section 58H, lower-limit water-level detection section 58LL, and upper-limit water-level detection section 58HH.

The gas-liquid separation device 90 does not include the permeable blocks 42a and 42b, and this eliminates the need to provide the block member 92 with the windows 60a and 60b and the need to provide the plate members 94a and 94b with the through holes 74a and 74b.

For the second embodiment, in particular, even if water is scattered in fluctuating pressure operation, the advantageous effects of being capable of effectively reducing the adverse effects from the water droplets and detecting the water-level with high precision are obtainable. In addition, there is an advantage in that the configuration is simplified and reduction in the cost of manufacturing can be easily achieved.

According to the embodiment of the present invention, a water electrolysis system includes a high-pressure water electrolysis apparatus and a gas-liquid separation device. The high-pressure water electrolysis apparatus is configured to electrolyze water and generates oxygen and hydrogen having a higher pressure than a pressure of the oxygen. The gas-liquid separation device is to separate the hydrogen containing moisture discharged from the high-pressure water electrolysis apparatus into the hydrogen from which the moisture is removed and water. The high-pressure water electrolysis apparatus is to supply the hydrogen from which the moisture has been removed to a hydrogen pipe that communicates with a hydrogen filling unit, and is to discharge the water to a discharge pipe.

The gas-liquid separation device in the water electrolysis system includes a block member which includes a gas-liquid separation opening and a water-level detection opening, and the gas-liquid separation opening and the water-level detection opening extend substantially vertically.

The gas-liquid separation opening and the water-level detection opening include respective bottom portions which integrally communicate with the discharge pipe, and the discharge pipe is disposed at a lower side portion of the block member. The water-level detection opening includes a top portion coupled to an upper portion of the gas-liquid separation opening, the upper portion communicating with the hydrogen pipe disposed at an upper portion of the block member.

The water-level detection opening further includes a top water-level detection section, and the block member further includes an inlet hole in which the hydrogen is introduced from the high-pressure water electrolysis device, the inlet hole being disposed at an upper side portion of the block member, the inlet hole being positioned above the top water-level detection section of the water-level detection opening.

For the water electrolysis system, the water-level detection opening may preferably further include a bottom water-level detection section, each of the top water-level detection section and the bottom water-level detection section may preferably include opposing windows opened outward in opposite surfaces that intersect a side surface of the block member, and each of the windows may preferably include a window side wall that includes a slope at least in its bottom surface, the slope being inclined outward toward the water-level detection opening.

For the water electrolysis system, the water-level detection opening may preferably further include an upper-limit water-level detection section positioned above the top water-level detection section, and the inlet hole may preferably be arranged at a height position between the upper-limit water-level detection section and the top water-level detection section. Here, the top water level indicates the height of the water level at which the water starts being discharged, and the upper-limit water level indicates the height of the water level at which discharge has not been properly performed, the water level has reached the critical water level, and the system needs stopping.

For the water electrolysis system, the gas-liquid separation device may preferably further include permeable blocks and plate members, the permeable blocks may preferably be arranged in the windows and disposed on the opposite surfaces of the block member, each of the permeable blocks including a light transmitting members, the block member may preferably be disposed between the plate members such that the permeable blocks are located therebetween, and the plate members may preferably be clamped and fixed by a plurality of clamp bolts.

For the water electrolysis system, the light transmitting member may preferably be a substantially columnar glass body, and each of the permeable blocks may preferably further include a metallic block member having an opening that accommodates the glass body.

For the water electrolysis system, at least each of the top water-level detection section and the bottom water-level detection section may preferably be provided with a transmission optical sensor.

For the water electrolysis system, the water-level detection opening may preferably be provided with a capacitance type level gauge.

With the embodiments of the present invention, because the block member includes the substantially vertically extending gas-liquid separation opening and water-level detection opening, the strength and stiffness of the entire gas-liquid separation device can be improved. Therefore, also in producing high-pressure hydrogen, the block member can sufficiently withstand the pressure of the high-pressure hydrogen.

In addition, the inlet hole into which high-pressure hydrogen is introduced from the high-pressure water electrolysis apparatus is positioned above the top water-level detection section of the water-level detection opening. Accordingly, in normal operation, the water level in the gas-liquid separation opening is maintained at a position below the inlet hole. This can prevent hydrogen from flowing into water stored in the gas-liquid separation opening in introducing high-pressure hydrogen into the gas-liquid separation opening.

Therefore, water droplets and air bubbles occurring in the top water-level detection section and the bottom water-level detection section can be satisfactorily reduced, high-pressure hydrogen containing moisture can be satisfactorily separated into the hydrogen and water, sufficient strength can be achieved, and the water level can be accurately measured.

Obviously, numerous modifications and variations of the present invention are possible in light of the above teachings. It is therefore to be understood that within the scope of the appended claims, the invention may be practiced otherwise than as specifically described herein.

What is claimed is:

1. A water electrolysis system comprising:
    a high-pressure water electrolysis apparatus configured to electrolyze water to generate oxygen and hydrogen having a higher pressure than a pressure of the oxygen; and
    a gas-liquid separation device to separate the hydrogen containing moisture discharged from the high-pressure water electrolysis apparatus into the hydrogen from which the moisture is removed and water, the gas-liquid separation device being to supply the hydrogen from which the moisture has been removed to a hydrogen pipe that communicates with a hydrogen filling unit, the gas-liquid separation device being to discharge the water to a discharge pipe,
    wherein the gas-liquid separation device includes a block member which includes a gas-liquid separation opening and a water-level detection opening, the gas-liquid separation opening and the water-level detection opening extending substantially vertically and including respective bottom portions which integrally communicate with the discharge pipe,
    the discharge pipe is disposed at a lower side portion of the block member,
    the water-level detection opening includes a top portion and a top water-level detection section, the top portion being coupled to an upper portion of the gas-liquid separation opening, the upper portion communicating with the hydrogen pipe disposed at an upper portion of the block member, and
    the block member further includes an inlet hole in which the hydrogen is introduced from the high-pressure water electrolysis device, the inlet hole being disposed at an upper side portion of the block member, the inlet hole being positioned above the top water-level detection section of the water-level detection opening.

2. The water electrolysis system according to claim 1, wherein the water-level detection opening further includes a bottom water-level detection section,
    each of the top water-level detection section and the bottom water-level detection section includes a first window and a second window, the first and second windows being opened outward and facing each other, the first and second windows being respectively formed in first and second surfaces of the block member, the first and second surfaces intersecting with a side surface of the block member, the inlet hole being disposed in the side surface, and
    each of the first and second windows includes a window side wall that includes a slope at least in a bottom surface of the window side wall, the slope being inclined outward toward the water-level detection opening.

3. The water electrolysis system according to claim 2, wherein the water-level detection opening further includes an upper-limit water-level detection section positioned above the top water-level detection section, and
    the inlet hole is arranged at a height position between the upper-limit water-level detection section and the top water-level detection section.

4. The water electrolysis system according to claim 2, wherein the gas-liquid separation device further includes permeable blocks, a first plate member and a second plate member,
    the permeable blocks are respectively disposed on the first and second surfaces of the block member to cover the first and second windows, each of the permeable blocks including a light transmitting member,
    the block member is disposed between the first and second plate members,
    the permeable blocks are respectively located between the block member and the first plate member and between the block member and the second plate member, and
    the first and second plate members are clamped and fixed by a plurality of clamp bolts.

5. The water electrolysis system according to claim 4, wherein the light transmitting member comprises a substantially columnar glass body, and
    each of the permeable blocks further includes a metallic block member having an opening that accommodates the glass body.

6. The water electrolysis system according to claim 1, wherein each of the top water-level detection section and the bottom water-level detection section includes a transmission optical sensor.

7. The water electrolysis system according to claim 1, wherein the water-level detection opening is provided with a capacitance type level gauge as the top water-level detection section.

8. The water electrolysis system according to claim 3, wherein the gas-liquid separation device further includes permeable blocks, a first plate member and a second plate member,
    the permeable blocks are respectively disposed on the first and second surfaces of the block member to cover the first and second windows, each of the permeable blocks including a light transmitting member,
    the block member is disposed between the first and second plate members, the permeable blocks are respectively located between the block member and the first plate member and between the block member and the second plate member, and the first and second plate members are clamped and fixed by a plurality of clamp bolts.

9. The water electrolysis system according to claim 8, wherein the light transmitting member comprises a substantially columnar glass body, and each of the permeable blocks further includes a metallic block member having an opening that accommodates the glass body.

10. The water electrolysis system according to claim 2, wherein each of the top water-level detection section and the bottom water-level detection section includes a transmission optical sensor.

11. The water electrolysis system according to claim 3, wherein each of the top water-level detection section and the bottom water-level detection section includes a transmission optical sensor.

12. The water electrolysis system according to claim 4, wherein each of the top water-level detection section and the bottom water-level detection section includes a transmission optical sensor.

13. The water electrolysis system according to claim 5, wherein each of the top water-level detection section and the bottom water-level detection section includes a transmission optical sensor.

\* \* \* \* \*